(12) United States Patent
Santos, III (10) Patent No.: US 11,608,216 B2
(45) Date of Patent: Mar. 21, 2023

(54) CONTAINERS AND COVERS (71) Applicant: Alfred M. Santos, III, Beverly Hills, CA (US)

(72) Inventor: Alfred M. Santos, III, Beverly Hills, CA (US)

( * ) Notice: Subject to any disclaimer, the term of this patent is extended or adjusted under 35 U.S.C. 154(b) by 861 days.

(21) Appl. No.: 15/310,096

(22) PCT Filed: May 9, 2015

(86) PCT No.: PCT/IB2015/053402
§ 371 (c)(1),
(2) Date: Feb. 10, 2017

(87) PCT Pub. No.: WO2015/170302
PCT Pub. Date: Nov. 12, 2015

(65) Prior Publication Data
US 2017/0275065 A1 Sep. 28, 2017

Related U.S. Application Data (60) Provisional application No. 61/991,493, filed on May 10, 2014, provisional application No. 61/990,103, filed on May 8, 2014.

(51) Int. Cl.
B65D 47/40 (2006.01)
B65D 51/16 (2006.01)
(Continued)

(52) U.S. Cl.
CPC ......... *B65D 47/40* (2013.01); *A47G 19/2272* (2013.01); *B65D 43/02* (2013.01);
(Continued)

(58) Field of Classification Search
CPC ........ B65D 47/40; B65D 47/06; B65D 47/32; B65D 2543/00046; A47G 19/2272
(Continued)

(56) References Cited

U.S. PATENT DOCUMENTS 4,589,569 A * 5/1986 Clements ........... B65D 43/0212
206/508
5,398,843 A * 3/1995 Warden .............. B65D 43/0212
220/254.1
(Continued)

OTHER PUBLICATIONS

International Search Report and Written Opinion from PCT Application No. PCT/IB15/53402, dated Sep. 15, 2016.

*Primary Examiner* — Don M Anderson
*Assistant Examiner* — Jennifer Castriotta
(74) *Attorney, Agent, or Firm* — Kali Law Group P.C.

(57) ABSTRACT

A device and system that can perform bi-directional gas and fluid communication, thereby preventing the accidental spill and splash of sloshing liquids through the sip-hole orifice of a liquid container and/or the sip-hole orifice of its lid, but that still allows liquid to flow through the sip-hole. This is achieved by cutting into the sip-hole, extending the sip-hole and creating a tubular flow-path or labyrinth flow-path that can channel and direct the flow of liquid into a controlled and desired flow and rate via an inlet configured to do so, and by adding a removable plug. These elements help to buffer and deflect sloshing liquid thereby minimizing or preventing the accidental release of liquid, and in many cases improving the purposeful flow of liquid back into the container.

17 Claims, 4 Drawing Sheets (51) Int. Cl.
  *A47G 19/22* (2006.01)
  *B65D 43/02* (2006.01)
  *B65D 47/06* (2006.01)
  *B65D 47/32* (2006.01)
  *B29D 99/00* (2010.01)

(52) U.S. Cl.
  CPC ............. *B65D 47/06* (2013.01); *B65D 47/32* (2013.01); *B65D 51/1611* (2013.01); *B29D 99/0096* (2013.01); *B65D 2543/00046* (2013.01)

(58) Field of Classification Search
  USPC .................................................. 220/703–719
  See application file for complete search history.

(56) References Cited

U.S. PATENT DOCUMENTS

| | | | | |
|---|---|---|---|---|
| 5,624,053 | A * | 4/1997 | Freek | B65D 21/0219 220/380 |
| 5,911,331 | A * | 6/1999 | Boller | B65D 43/0256 220/254.3 |
| 6,905,044 | B1 * | 6/2005 | Russo | B65D 43/0212 220/711 |
| 2002/0167989 | A1 | 11/2002 | Russo | |
| 2003/0024930 | A1 * | 2/2003 | Smith | B65D 43/0212 220/254.1 |
| 2004/0232154 | A1 * | 11/2004 | Smith | A47G 19/2211 220/713 |
| 2005/0173443 | A1 * | 8/2005 | Crudgington | B65D 47/40 220/713 |
| 2006/0169707 | A1 * | 8/2006 | Walz | A47G 19/2272 220/780 |
| 2007/0012709 | A1 * | 1/2007 | Durdon | B65D 43/0212 220/791 |
| 2009/0266829 | A1 * | 10/2009 | Bailey | B65D 43/0202 220/713 |
| 2009/0294460 | A1 * | 12/2009 | Hovsepian | B65D 43/0212 220/713 |
| 2010/0133272 | A1 | 6/2010 | Whitaker et al. | |
| 2010/0301048 | A1 * | 12/2010 | Tokunaga | A47G 19/2205 220/367.1 |
| 2010/0308046 | A1 | 12/2010 | Serra | |
| 2013/0020338 | A1 * | 1/2013 | French | B65D 43/0208 220/713 |
| 2014/0042177 | A1 * | 2/2014 | Fleming | B65D 43/02 220/713 |
| 2014/0042178 | A1 * | 2/2014 | Brannock | B65D 47/06 220/713 |
| 2015/0191282 | A1 * | 7/2015 | Crudgington | B29D 99/0096 220/254.7 |

* cited by examiner

CONTAINERS AND COVERS

FIELD OF THE INVENTION

The present disclosure relates generally to an improvement of a device, a system and a method of manufacture that improves containers and their covers. More specifically, to a container, container lid, or a container cover with an partially concave and extended sip-hole or a combination that integrates such along with a and plug to prevent sloshing liquid from accidentally spilling or splashing out from a sip-hole on a container and or its cover. Applications include containers or their lids such as those found on coffee/tea cups at retail outlets such as Starbucks, 7/11, and Dunkin Donuts for hot or cold liquids. Additional applications of the invention also include containers, lids, with liquids, and other substance matter that are sometimes heated and often reheated multiple times for reuse. Other applications are for containers, bottles, lids, or the like, for use in deflecting, limiting, directing, controlling exchange of gas and their liquids and other matter through a hole.

BACKGROUND

People often purchase liquids in containers and then walk or drive to another distant location while attempting to consume their liquid or beverage. Despite the care and consideration during transport and consumption, unexpected jostling and shaking often occurs. This usually results in accidental spill and splash of the liquid from its container or lid. The previous scenarios are accentuated in the case of a full container, wherein even slight sloshing back and forth of the liquid results in the hot or cold contents splashing out of the sip hole, possibly causing a serious burn to a consumer. When a consumer is driving in a vehicle, a small splash of a hot beverage has been known to cause a serious accidents, serious burns, stains on clothing, or stains in the upholstery of the vehicle.

Even in the best of situations where the consumer is sitting down or in a stationary position enjoying a liquid held within a container, it is common to experience some spillage from the container, it lid, and their sip-holes.

The use of sip-hole plugs or stoppers is costly, terrible for the environment, you need two hands to operate them, and worst of all, they prevent a person from enjoying their beverage until the plug is removed. For a driver this could have catastrophic results, because this means taking both hands off the steering wheel to begin the removal process. A smart driver might use only one hand to remove the plug, and then place it down somewhere else in their car where it will further drip and stain the car. At that point, the sip-hole is open again, and accidental spillage will likely resume. Other then consumption-less transport, the plug is not the best solution.

The use of straws to slow the spillage from sip holes is outright dangerous. Most people don't realize that drinking straws provided at stores are designed for cold beverages only, not for hot beverages. Regular drinking straws are made with cheaper plastics that leach toxins into beverages. The smaller, little red and black "stirring straws" found in stores are made from a heat resistant safe plastic which does not leach toxic chemicals into your hot coffee or tea. These little straws are meant to be used as mixing sticks and to sample flavor. They are not meant to be used as drinking straws, this is why they are short, and the hole is purposefully designed to be extra small. Even if you couple three or four stirring straws, it makes for a messy and leaky drinking experience. Drinking hot beverages from drinking straws is toxic. It is possible to find nontoxic "hot-safe" straws online, but they are not provided at local beverage shops and are generally very expensive, and usually constructed from glass, metal or other expensive harder to work with plastics.

Additionally, there is a real need for a device that allows the consumer to drink from a container safely without requiring the consumer's head to tilt backward, as the level of liquid within the container decrease and the user approaches their last few sips. Generally a person must use a head tilt movement to access this liquid. This movement, and the actual container/lid then generally result in a line of sight blockage or impediment. This is particularly true for people driving cars where line of sight blockage can become highly dangerous, even for just a short moment. Additionally, there is an issue with current popular beverage lids, being designed and constructed as being generally flat. The problem with this, which only exacerbates the head tilt problem further, is that flat lids, or partially flat lids, are not designed/constructed to fit the human face. The nose for example, generally hits the top of a lid. This is uncomfortable, unnatural, and causes a person to have to tilt a beverage container further, to access the liquid within. Additionally, cups are generally more likely to leak at this point because the hot or cold liquid has usually softened and degraded the cup-lid seal. This is particularly true along the crease of a container. The more a person tilts the container, the better chances they have of experiencing a accidental and undesirable leak.

Containers and lids are also not designed to handle and deal with any liquid that has undesirably sloshed or leaked out. Pools of coffee and tea are often seen resting on top of lids and containers. If this happens while driving or walking, that pool often splashes up and off the lid, and on to everything and everyone nearby. In fact, this is how most cars become slashed across large areas with beverages.

Another problem with containers and lids, but particularly lids, is that they are not designed or constructed to fit the human face. As discussed above, the nose bumping is known problem. However, the human lips, the actual part of a users body which makes contact with a lid, is rarely if ever taken into consideration when designing a lid. This is important, not just for comfortably, but also for proper and secure lip/lid sealing. Most coffee and tea drinkers can attest to their favorite beverage splashing out from their lips or mouth, this is generally due to a poorly designed lip/lid seals. In most cases, it's simply cheaper to manufacture this way, so companies don't take the time to solve this problem, and make it a cost effective solution that fixes both problems. Some lids are designed to feel like drinking from a coffee mug, but that does not help with spill and splash issues, in fact it generally worsens them. Lids in general, are used to close off a container, and separate some matter from the outside world. This is helpful when preventing spill and splash, but for beverage enthusiasts such as coffee and tea lovers, it creates a bigger problem. The sense of smell is sometimes said to be up to 70% of the sense of taste. Without smell, taste does not work well. Lids and containers are not generally designed to help accommodate this shortcoming and allow for smell with also still preventing spill and splash.

Extended spouts, elevated sections, raised sip-holes, and a combination of have transformed some lids into children's sippy-cups. Some elevated spout designs help to create more space between the sip-hole and the sloshing liquid inside a container, but they are limited in the help they can offer. Certainly, they do not help with other problems such as pooling liquid on top of the lid, blocking scent of the beverage inside, plug issues, stacking issues, and comfortably is not a marque factor with elevated spouts.

Lids, in general are not constructed to be used with an integral plug that was specifically designed to be used with specific lid. These two components are often designed, owned, and manufactured by different companies, but yet they are expected to work together, and universally. Well lids and their sip-holes are not universal, so that is problem. There are some lids, that are designed with built in slide seals/plugs, and others that must be inserted. The flap type or flip type sip-hole lid, like those often found at popular coffee houses, do little to prevent spill and splash. Worse, they do not work at all as solid a plug or seal when needed. Manufacturing the better, more expensive lids, is usually the two or more part process, and it is costly. There are no solve all, perfect lid, plug, seals, shapes, fits, currently available when looking at the beverage lid space, particularly when you take into consideration limitations with modern manufacturing and costs.

These previous scenarios are compounded exponentially when there is no lid to prevent splashing or spilling of the liquid. The fast paced modern "to-go" lifestyle we live has become commonplace. As a result, drive-through food and, more importantly, drive-through beverage services are now an integral part of life. Therefore, there is a real and present need for a device that will prevent the splash of liquid through a sip-hole of containers and lids, but which does not prevent a person from safely drinking or enjoying the fluid both during transport or stationary scenarios.

Equally important, is the need to produce reliable, low cost, and environmentally friendly solutions for all of these problems while still allowing a person to enjoy their liquid consumption no matter what sort of lifestyle they choose to live.

SUMMARY

Definitions

Within this application and its claims, have words that often use their traditional meanings. Other times words are used or created to describe structure and or function. This definition section is used to help create clarity in understanding this application in its whole. Words are further defined beyond this definition section within this application and its subcomponents.

Container Cover—the topside of container where the sip-hole would be located in a integrated container. The lid of a container such as a coffee/tea lid, is often used in examples and drawings within. The word lid, cover, container, container cover, and the like are interchanged within this application, but it generally relates to the portion of a container with the sip-hole, whether its one unit or multiple units.

Tube—is used as the common definition of tube. In certain instances, other words are used to describe a tube, and or the function of a tube. Integrated Tube, Extended Tube, Tubular, Hollow, Flow-Path, Tubular Flow-Path, are some instances or combinations of such occurrences. They are used to describe one or both of a said function and or structure. The shape of which can any combination of but not limited to; cylindrical, circular, oval, square, rectangle, triangle, any other angular shape and rounded such.

Labyrinth Flow-Path—is discussed in some instances. This labyrinth is one or more angles, and or curves, and or bends added, to a tube, causing it to round, curve, bend, in any angle, shape, or design desired. They are often used to help direct and control the flow of matter within a tube, or flow-path.

Vented Flow-Path—is a flow-path with an opening, and or a hole. These holes are often, but not always pertaining spaces cut out of the structure, or tube, to allow gas, liquid, or other matter, to vent or flow through.

Opening—is used as common meaning, and or as a hole within a structure. Can be constructed into a part, or cut into it with some common means.

Hole—Common meaning, and or open space within a structure. Sip-Hole is used often in this application. This term is usually but not always pertaining to the sip-hole found on containers and or their lids. Beverage containers and lids are generally constructed with such sip-holes. Sip-holes can, in some cases within this application can create a flow-paths or tubes, when extended.

Sip-Hole Extension—is generally, but not always, referencing an object, which transforms a sip-hole. Transformations can include many sorts or combinations of sorts including but not limited to; shape, size, material, and in length. Generally a sip-hole extension shall refer to lengthening a sip-hole, by at least (2.0 mm) two millimeters.

Plug—is used with its common meaning, and or used to describe a function. Sealing a hole with a plug is common example. A plug is generally constructed to be sized and shaped to fit the appropriate hole it will be sealing and or plugging. For the purpose of this application, plugs are often, but not always constructed with, if needed, flanges, rims, bevels, ridges, grooves, holes, seals, thicken or thinned areas, attachments, adhesives, slides, slots, lifts, lips, a means to secure, along with other things discussed within this application. Means often relates to common known means, but it can relate some discussed within, and some uncommon means. In certain embodiments, plugs or seals are often designed to be manufactured as one component, and or to work together with another component, such as sip-hole, a lid, and or a container. Generally in a system, and with a method of manufacture.

Inlet—used with its common meaning, and or a hole, or opening, a structure and or function, which can act to allow matter to enter it. Some inlets discussed can work bi-directionally. Inlets generally refer to the starting point, where matter can originate, but in this application inlet is sometimes used to return matter back to the inlet, for redeposit into a container. They can be constructed or cut into any side wall including bottoms and tops. Sized and shape to fit fluid need.

Viscosity Barrier—these generally relate to structure, that causes a function, on or within a tube, or flow-path. Generally used to slow, and or control matter flow. This works by breaking surface or molecule tension in matter, and causes friction. Can be a flange, and chamber, a cut, a filter, screen, holes, bevel, lip, ridge, or the like of.

Nose-Depression—is a constructed component with a means for adding comfort and functional benefit. Generally a depression, swoop, angle, sized and shaped to fit a human nose, on the topside/exterior side of lid or container. Benefits include but are not limited to fit, feel, less needed head tilt, less nose bump. In certain embodiments this component can help to form other desirable components, such as a lip-groove, a swoop, a catch, a pool, and can provide a better place for a air hole, or multi-purpose air-hole/drain-hole. This component is sometimes used to serve multiple purposes.

Lip-Groove—depression, that fits snugly with a human lips, to form a better and more comfortable lip/container or lip/lid seal for the sip-hole. Prevents splashing when sipping. Concave sip-hole in some embodiments is combined with, or used as one in the same.

Angled-Depression/Swoop—works to collect and or capture any liquid which might undesirably splash out from a sip-hole. It can also work to channel/funnel liquid, toward a pool, and or a gas-liquid-drain-hole. Often used to channel liquid towards the concave sip-hole and or pool and drain holes. Generally such a depression/swoop would be found on top of lid. In some embodiments these can end or stop at a back stop which helps to pool liquid.

Pool-Depression—works to collect and capture any liquid that might undesirably splash out from a sip-hole. Can be used to work with gas-liquid-drain-hole which doubles as a drain-hole by allowing pooled/captured liquid to drip back into the container. Can also act to store small amounts of the escaped liquid, so that a user can enjoy the aroma of the liquid they are consuming, which is generally said to improve the drinking taste experience, particularly with beverages such as coffee and tea. Some covers might employ more then one pool and or back stop.

Groove-Cut—used to direct or channel liquid that may have undesirably splashed out from a sip-hole. Or to collect, direct, control any liquid that may have escaped via the sip-hole. This groove, cut, flange on certain embodiments will act to direct liquid into an angled-depression, and or swoop, and or a drain-hole, and or pool-depression. There can be a plurality on one embodiment.

In accordance with an embodiment, it is an objective of this application to obviate or mitigate some disadvantages of existing solutions to the problems discussed within this application and others known otherwise.

In accordance with an embodiment, it is among an objective of this application to provide a system and device with a partially concave sip-hole as liquid-pull-drain or guide, a extended sip-hole, and an inlet, control the flow of molecules multi-directionally, and by adding a removable plug, a user can control all desired aspects including but not limited to; spill, splash, heat loss, taste & smell.

In accordance with an embodiment, it is among an objective of this application to provide a system and device to prevent or minimize spillage and splash of sloshing liquids from containers, their lids, or their sips-holes, without obstructing flow of liquid from sip-holes, and even repurposing liquid that may have accidently settled a top a container cover or lid. In certain embodiments this is accomplished with three components, a cover with at least a partially concave sip-hole, at least one tube integrated with the perimeter of such a sip-hole, at least one inlet on such a tube, the combination of which allows bi-directional fluid and gas matter control. Furthermore, when used with an integral plug, this system and device can solve every problem with modern known container covers.

In accordance with an embodiment, it is among an objective of this application to provide a system, and device to prevent or minimize spillage and splash of liquids from containers, their lids, or their sips-holes, while improving the flow of liquid from their sip-holes.

In accordance with an embodiment, it is among an objective of this application to provide a system, and device to prevent or minimize spillage and splash of liquids from containers, their lids, or their sips-holes, without preventing its sip or pour capabilities.

In accordance with an embodiment, it is among an objective of this application to provide a system, and device to prevent or minimize spillage and splash of liquids from containers, their lids, or their sips-holes, while on the go and in stationary scenarios.

In accordance with an embodiment, it is among an objective of this application to provide a system, and device to provide ease of use while consuming liquids from containers, their lids, or their sips-holes, in both stationary scenarios, and in on the go/active scenarios one might encounter during transport.

In accordance with an embodiment, it is among an objective of this application to provide a system, and device to provide the ability to consume liquids from containers, their lids, or their sips-holes, without having to obstruct line of sight view with a container and or its lid.

In accordance with an embodiment, it is among an objective of this application to provide a system, and device to provide the ability to consume liquids from containers, their lids, or their sip-holes, without having to tilt the liquid container as much as person might normally have to do so to consume the liquid inside.

In accordance with an embodiment, it is among an objective of this application to provide a system, and device, that provides the ability to consume liquids from containers, their lids, or their sips-holes, without having to tilt a liquid container as much as person might normally have to in efforts to better preserve the container/lid seal, and its crease for a longer duration of time, thereby reducing the likelihood of accidental leaking of liquid.

In accordance with an embodiment, it is among an objective of this application to provide a system, and device to provide the ability to consume liquids from a container, a lid, or its sip-hole as one might normally do, while adding the ability to suck the liquid through that same sip-hole, by extending it with some additional components such as tube, lip-groove, inlet. This tube, or tubular flow-path in some preferred embodiments, is configured to help limit, or prevent undesirably liquid or materials from escaping a container or lid.

In accordance with an embodiment, it is among an objective of this application to provide a system, and device that provides the ability to consume liquids from a container, a lid, or its sip-hole as one might normally do, while adding the ability to suck the liquid through an added flow-path thereby increasing the flow of liquid for better, or more controlled consumption.

In accordance with an embodiment, it is among an objective of this application to provide a system, and device that can provide the ability to prevent accidental splash of liquids from a container, a lid, or its sip-hole, while retaining the ability to consume the liquid without having to remove a plug, to access the liquid.

In accordance with an embodiment, it is among an objective of this application to provide a system, and device that can provide the ability to prevent accidental splash of liquids from a container, a lid, or its sip-hole, while retaining the ability to consume the liquid, with one hand, to help improve safety in situations when a person might need to use their other hand, such as in the case of removing a plug while driving.

In accordance with an embodiment, it is among an objective of this application to provide a system and device with at least one tubular flow-path attached to the sip-hole of a container, or its lid, that liquid can flow through.

In accordance with an embodiment, it is among an objective of this application to provide a system, and device with at least one vented flow-path to a base side of a sip-hole on a container, or on the sip-hole on its lid.

In accordance with an embodiment, it is among an objective of this application to provide a system, and device with a labyrinth flow-path added to the sip-hole on a container, or on the sip-hole on its lid, so that liquid can flow through, but sloshing liquid could be deflected.

In accordance with an embodiment, it is among an objective of this application to provide a system, and device with at least one viscosity barrier on its sip-hole, or on its flow-path, capable of deflecting and helping to control sloshing liquid.

In accordance with an embodiment, it is among an objective of this application to provide a system, and a device that could have a built in flow-path, and a plug.

In accordance with an embodiment, it is among an objective of this application to provide a system, and at least one device that could reduce manmade waste made by companies or people when using liquid plugs or straws in sip-holes.

In accordance with an embodiment, it is among an objective of this application to provide a system, and at least one device that could reduce the amount of materials needed to construct standard sip-hole plugs, straws, and lids.

In accordance with an embodiment, it is among an objective of this application to provide a system, and at least one device that could reduce the manufacturing costs associated with standard splash devices used with liquid containers and their lids, and accessories, by adding a tubular flow-path that can be manufactured as one piece, and not a multi-piece device.

In accordance with an embodiment, it is among an objective of this application to provide a system, and at least one device that could be constructed as a plug to be attached to and fit snugly to a container or its lid, to prevent or help reduce liquid spillage or splashing.

In accordance with an embodiment, it is among an objective of this application to provide a system, and a device that can work with an attached plug to prevent liquid from passing through its flow-path, and or out of its sip-hole. In certain preferred embodiments, said plug might be attached using a sticker type format.

In accordance with an embodiment, it is among an objective of this application to provide a system, and a device that combines the benefits a sip-tube and a plug together, so they can be manufactured into a container or its lid, to prevent sloshing liquid from splashing out from a sip-hole. In certain preferred embodiment, the same amount of manufacturing steps and processes, thereby not raising the cost. In certain preferred embodiments, thermoforming would be a means for manufacture.

In accordance with an embodiment, it is among an objective of this application to provide a system, and a device that combines the benefits a sip-tube into a sip-hole, so that they can be manufactured into a container or its lid using popular methods of manufacture. In certain preferred embodiment, the same amount of manufacturing steps and processes, thereby not raising the cost. In certain preferred embodiments, thermoforming would be a means for manufacture.

In accordance with an embodiment, it is among an objective of this application to provide a system, and a device that could be constructed as a plug to fit snugly in its sip-hole by adding a flange, a groove, a taper, and or bevel to its plug to help secure it to fit perfectly snug within the sip-hole. In certain preferred embodiment, the sip-hole or tubular flow-path can be constructed with a flange, groove or bevel, to help accommodate snug fit of plug. In other certain preferred embodiments, both the plug and sip-hole or flow-path are designed with mating flanges, grooves, bevels, to accommodate snug fit and seal.

In accordance with an embodiment, it is among an objective of this application to provide a system, and at least one device that could be constructed as two parts, one as a plug to be attached to and fit snugly to the second part, a container or its lid, with a tubular flow-path; both components used together to prevent or help reduce liquid spillage or splashing. In certain preferred embodiments, the components are attached, and sold/distributed as one unit. In some preferred embodiments, the components have a means to attach to one and other in more then one way, meaning to be used in an open and closed fashion. In some preferred embodiments these two components are manufactured in as one part. In certain embodiments, the plug can be of the adhesive kind.

In accordance with an embodiment, it is among an objective of this application to provide a system, and device that could be used and reused many times.

In accordance with an embodiment, it is among an objective of this application to provide a system, and device to provide the ability to consume liquids from containers, their lids, or their sip-holes, without having to tilt the liquid container as much as person might normally have to do so to consume the liquid inside, by adding a nose-depression on the top surface of container, or its lid, where a person nose can fit into.

In accordance with an embodiment, it is among an objective of this application to provide a system, and device that provides at least one lip-groove depression, that fits snugly with a human lips, to form a better and more comfortable lip/container/lid/sip-hole seal.

In accordance with an embodiment, it is among an objective of this application to provide a system, and device which provides a least one angled depression, or one swoop that works to collect and capture any liquid which might undesirably splash out from a sip-hole.

In accordance with an embodiment, it is among an objective of this application to provide a system, and device that provides a least one pool depression that works to collect and capture any liquid which might undesirably splash out from a sip-hole. This pool depression, on certain preferred embodiments, will have an air-hole which doubles as a drain-hole to allow pooled/captured liquid to drip back into the container. In other embodiment it can act to direct liquid back into the container via the sip-hole and or a drain-hole. This pool depression, on certain preferred embodiments, will also act to store small amounts of the escaped liquid, so that a user can enjoy the aroma of the liquid they are consuming, which is generally said to improve the drinking experience, particularly with beverages such as coffee and tea.

In accordance with an embodiment, it is among an objective of this application to provide a system, and device that provides a groove-cut to direct/channel liquid that may have undesirably splashed out from a sip-hole. This groove-cut on certain embodiments will act to direct liquid into an angled-depression, or swoop, or pool-depression.

In accordance with an embodiment, it is among an objective of this application to provide a system, and device with at least one partially concave sip-hole, one flow-path and with at least one of, or all of, or any combination of these components; a labyrinth of flow-paths, a viscosity barrier, a lip-groove, a nose-depression, groove-cut, a pool, a angled depression, a swoop, a drain-hole, a air-hole, a side-wall flow-path cutout, a vented flow-path, a extended sip-hole at least one direction, a plug, a slide. In certain preferred embodiments, these features could be manufactured as part of a container, or a lid, for improved spill and splash control in bi-directional gas-liquid communication.

In accordance with an embodiment, it is among an objective of this application to provide a system, and a device that could have a built in extended tube, and or flow-path, and a plug, but which can still be stacked tightly for better packaging and distribution, short tubes, tapering, and fits are generally used to accomplish this.

In accordance with an embodiment, it is among an objective of this application to provide a system, and a device with an angled opening, and or inlet cut into the base of its flow-path, the angled base added to improve its bi-directional spill and splash prevention.

In accordance with an embodiment, it is among an objective of this application to provide a system, and a device with at least one opening, and or inlet cut into the sidewall of its tube/flow-path, the sidewall cut added to improve its bi-directional spill and splash prevention. In certain embodiments, such opening will be constructed partially on the sidewall, and base of a flow-path, or tube.

In accordance with an embodiment, it is among an objective of this application to provide a system, and a device with a flange, bevel or ridge added to its inner flow-path to help improve its spill and splash prevention and deflection. These flanges or the like are added adjacent to inlets to deflect liquid away.

In accordance with an embodiment, it is among an objective of this application to provide a system, and a device that could be formed using edible and/or scented material, or at least partially edible and/or scented material.

In accordance with an embodiment, it is among an objective of this application to provide a system, and a device that could be constructed, or partially constructed from visual temperature/thermal changing material.

In accordance with an embodiment, it is among an objective of this application to provide at least one method a manufacture to create disclosed systems, and devices; there are many known someone trained in the art of packaging and containers, any of the common will do, including thermoforming, vacuum forming, injection molding.

Among other things, variations of devices and systems of use in accordance with aspects of the present application would reduce the proliferation of non-biodegradable or less biodegradable items now commonly inserted into coffee cups and other beverage lids to prevent spills such as sip-hole plugs or straws.

In accordance with aspects illustrated herein, device embodiment variations may be used to prevent liquids from spilling from the small opening sip-hole and actually redirect them back into the sip-hole or other drain holes.

BRIEF DESCRIPTION OF THE DRAWINGS

Four (4) Drawing Sheets with 16 Figures.

DETAILED DESCRIPTION

The foregoing aspects, features and advantages of the present application will be further appreciated when considered with reference to the following descriptions of a few preferred embodiments and accompanying drawings, wherein like reference numerals represent like elements. In describing the preferred embodiments of the invention illustrated in the appended drawings, specific terminology will be used for the sake of clarity. However, this application is not intended to be limited to the specific terms used, and it is to be understood that each specific term includes equivalents that operate in a similar manner to accomplish a similar purpose. For purposes of illustration and ease of understanding, all FIG.'s have been illustrated as being integrated on beverage lids. However it should be understood that these improvements do not only work on lids, but also on containers themselves.

Figure 1:
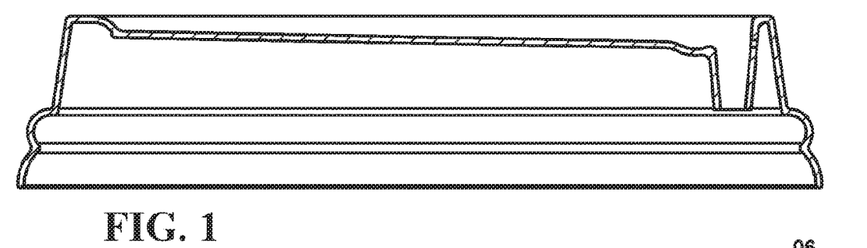
FIG. 1 is a cross section side view of an embodiment of the present invention.

Our detailed description starts by examining FIG. 1, an embodiment of the present application. FIG. 1 is a cross section illustration of a beverage lid. More specifically, an improved beverage lid, with a front-draining 36, partially concave sip-hole 31*a*, a tube extension 01, and a base side inlet 01*a*. FIG. 1's partially concave sip-hole 31*a* acts to help guide and pool escaped liquid that might otherwise setter on the top of a lid. 31*a* channels it down to the lowest center of gravity, and inevitably back into our tube extension that is integrated with the perimeter of the partially concave sip-hole. From there the liquid is pulled back into the container, where it will not burn anyone, stain anything, and it can serve its ultimate purpose, to become consumed. The liquid can reenter the container via the one or more inlets. This demonstrates a simple version of a bi-directional fluid communication spill prevention lid cover. Front draining aspect 36, is demonstrated in FIG. 1, this aspect helps to guide or channel escaped liquid faster then partially concave sip-hole can do so by itself. Most common coffee lids have a sunken top portion that acts to pool liquid, however this is the liquid that generally spills and splashes. The three components on this improved lid, partially concave sip-hole, inward tube extension, and inlet, when combined work to create the first bi-directional fluid communication cover that works to deflect, control, and direct liquid leaving the inside of the container cover, and then works to re-direct settled fluid back into the container from where it began its journey. When coupled with 36 Front draining aspect, this system is improved further.

Figures 2, 3, 4, 5:
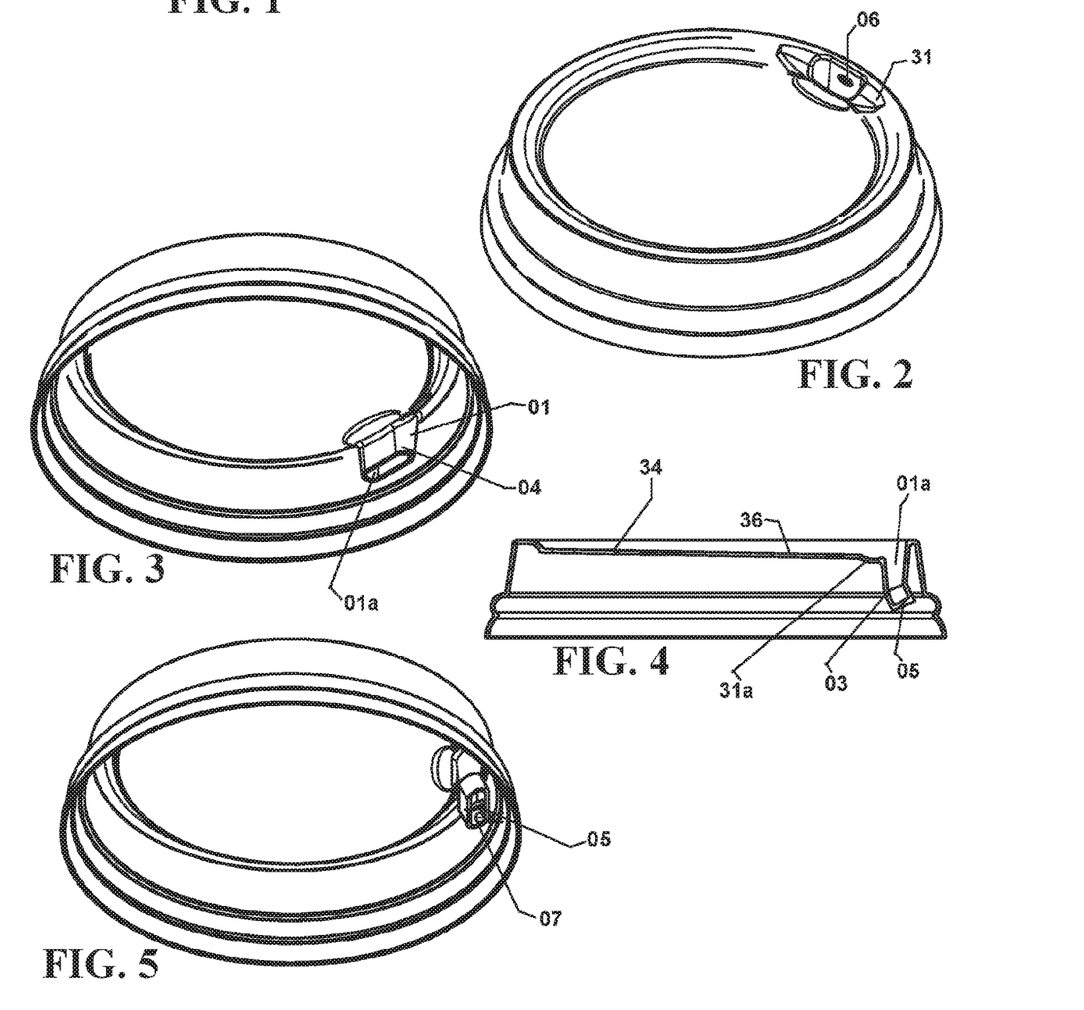
FIG. 2 is a back to front tilted top view of a similar embodiment from FIG. 1.
FIG. 3 is a back to front tilted bottom view of a similar embodiment from FIG. 1.
FIG. 4 is a side view cross section of the slightly different front-draining embodiment with an angled flow-path.
FIG. 5 is a tilted bottom view of a similar embodiment from FIG. 4.
Figures 6, 7:
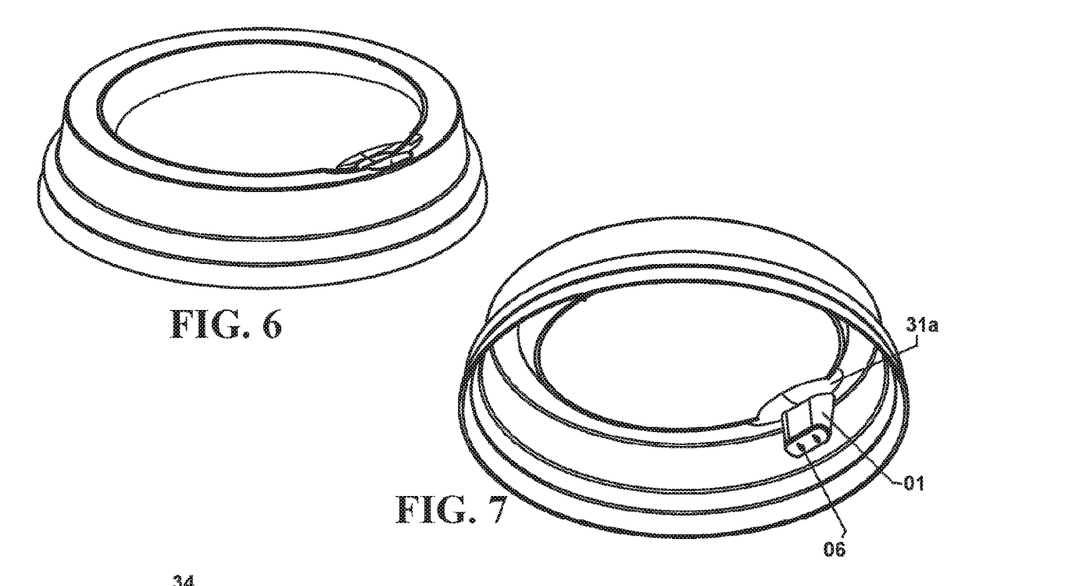
FIG. 6 is a front to back tilted top view of a rear-draining embodiment.
FIG. 7 is a bottom tilted side view of an embodiment similar to FIG. 6.
Figure 8:
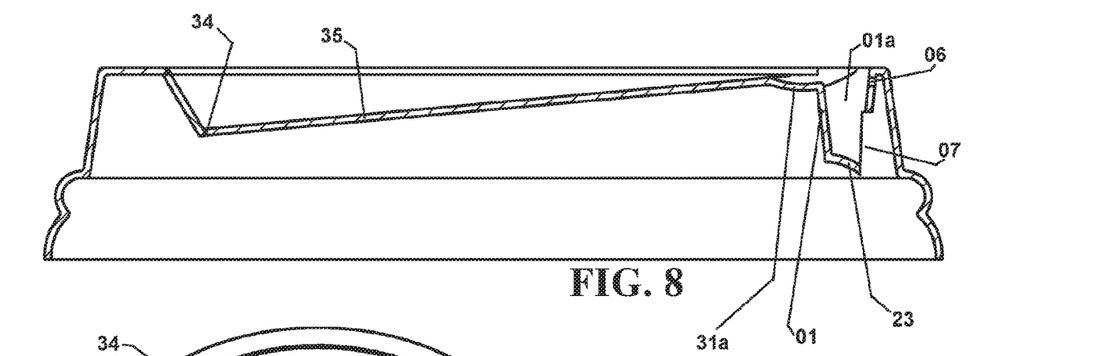
FIG. 8 is a cross section side view of a similar rear-draining embodiment seen in FIG. 7.
Figure 9:
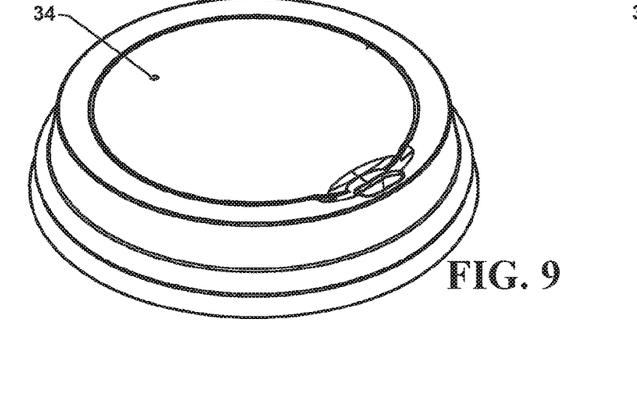
FIG. 9 is a top down tilted side view of an embodiment of the present application.

Bottom-side Inlet 01a on FIG. 1 & FIG. 3 are illustrated for ease of understanding. In other preferred examples, inlet 07 in FIG. 8 is constructed in the side tapered wall of concave sip-hole tube extension. This front sidewall inlet allows sloshing liquid to be deflected on the backside of tube extension 01, and it redirects liquid into tube extension and out of sip-hole 31a. Again, in this embodiment we see 31a partially concave sip-hole. If undesired liquid makes it way up the tube extension, there is great likelihood it will escape at its lowest center of gravity which very clearly is 31a partially concave sip-hole. FIG. 8 employees a secondary rear draining 35 angle, this extra angle functions to help pool any escaped liquid to the back side of the lid. 35 has an air-liquid-drain hole 34 that is formed to serve several functions, 1; it works as a standard air-gas exchange hole to allow air to enter the container so that when liquid is evacuating from the sip-hole it can do so smoothly, 2; functions as a drain secondary drain hole beyond the help partially concave sip-hole can handle alone 3; it is placed at the base of pool, and exactly where humans nostrils happen to land while taking sip, this hole functions to allow gas and liquid molecules to bi-directionally pass, thereby allowing a user to get a great sniff of their favorite beverage. Most common lids are made of cheap plastic, that when heated does not smell fantastic. Furthermore, it is said that more than half the sense of taste comes for the sense of smell so why buy a $5 coffee if you cannot smell or taste it. This feature is better illustrated in FIGS. 13, 14, and 15 with other preferred embodiments. Nose-Depression/Swoop 35a is illustrated top down in FIG. 14, and from the bottom side in FIG. 15. This component can be sized and shaped to fit many different types. The deeper the depression, the added benefits for liquid channeling into the 34a central pool as seen bottom up in FIG. 15 and top down in FIG. 14. This pool functions to store escaped liquid. This liquid can drain back into the container via 34 air-fluid-bidirectional drain. This pool helps to store small amounts of liquid to help with smelling the beverage when a person's nose is received into nose-depression 35b In FIG. 14 & FIG. 15 is a grooved channel that also works to direct escaped liquid from the partially concave sip-hole straight down and into the pool, where it can settle and drain back into the container.

Figures 13, 14, 15, 16:
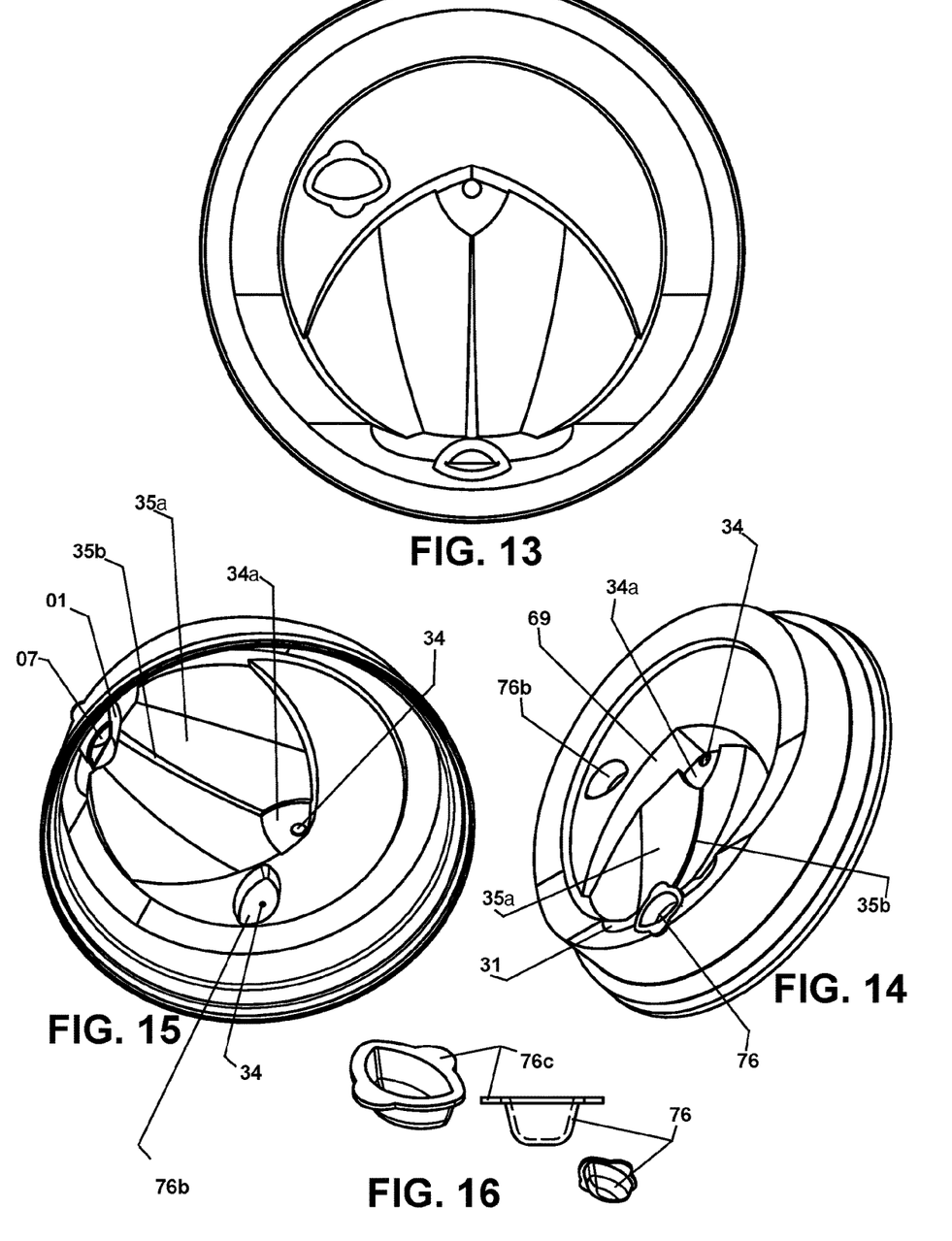
FIG. 13 is a top down view of a preferred embodiment. Showing a lip-groove, extended flow-path/sip-tube, front side-wall opening on sip-tube, nose-depression, swoop, groove-cutout, pool, air-hole/drain, liquid backstop; plug positioned in holder.
FIG. 14 is a top down tilted side view a preferred embodiment. Showing a lip-groove, nose-depression, swoop, groove-cutout, pool, air-hole/drain, liquid backstop; and a depressed plug holder on the top-side, with its plug positioned in the extended sip-hole.
FIG. 15 is a bottom up tilted side view a preferred embodiment. Showing a lip-groove, extended sip-tube/flow-path, with a front sidewall cutout or inlet in its sip-tube, nose-depression, swoop, groove-cutout, pool, air-hole/drain, liquid backstop; and a depressed plug-holder on the bottom-side, with a secondary air-hole in plug-holder.
FIG. 16 is a combination view of three different angles of a common plug that can be used for many preferred embodiments.

FIG. 1 illustrates another feature and function of partially concave sip-hole, this feature is better illustrated in FIG. 2 & FIG. 14, lip-press/lip-depression 31 extends partially 31a concave sip-hole/lip-press, or lip-indentation. This helps to form a natural upper lip seal on the topside of the cover. This natural and stronger seal helps to prevent the common problem of undesired splashing while sipping, it is also far more natural feeling to the human lip then a spout or lifted ridge such as those seen in many unpopular lids. Upward extending spouts and their rim or ridges do not feel natural on the mouth, even when the are formed with a lip-press, because of this, they can not form a complete and natural feeling lip-lid seal, which is important when discussing comfortability, and spill and splash prevention. This is the reason the raised spout is not a seen much in the open markets. Additionally, if a sip-hole is raised to a spout and or mounted on the top rim, it become hard, if not impossible to manufacture any additional sip-hole extension that may be desired, and common vacuum forming and thermoforming have tight tolerances that must be abided by with respect to upward/downward draft. Additionally, with a spout formation, you lose the ability to create a partially concave sip-hole which is what creates the drain and nice upper lip-press. All of these facts, in addition to fit, feel and function, help to illustrate the highly novel aspects of the improvements discussed herein this invention.

Each of the improvements detailed within can be produced using standard beverage lid and container manufacturing processes known to those skilled in the art. The purpose of some of these improvements is to lessen or eliminate accidental spill and splash of liquid from containers and their lids, without having to raise costs, and without having to use a plug or insert device to do so. We will also illustrate some embodiments where plugs are preferred.

In more detail, a sip-tube works be deflecting the sloshing liquid within the container when it's jostled, and by controlling the amount of liquid within the flow-path along with its direction and rate of flow, it also lessens the force excerpted by the sloshing liquid in the container on the liquid after it enters the flow-path, thereby minimizing or preventing accidental spill and slash, the concave sip-hole works to direct liquid back into the flow-path, or into another drain, where it can reenter.

Benefits:

Lessens or eliminates accidental spill and splash from sip holes and captures accidentally escaped liquid, then pulls it back into the container.

Concave sip-hole adds suction ability to sip holes, which can increase liquid flow when desired.

Widens sip holes for faster consumption if desired.

Allows a modern person with an active lifestyle to be able to enjoy a liquid just the same and a stationary person without having to worry about spill or splash.

Helps to block dissipation of hot steam liquid which helps maintain heat longer while consuming hot liquids; thereby conserving desired temperatures, hot or cold.

Eco-conscious when compared to splash plugs, stir-sticks, and straws; less material, less waste, and they can be reused.

Offers at least four ways to consume a liquid more safely: a; prevents line of sight blockage caused by containers and their lids because of added sucking action and nose-depression, b; lessens spills which could cause burns, c; can consume liquids without the need of two hands like with a plug, d; less spill equals less distraction while conducting other potentially dangerous tasks such as driving. Overall makes for a more enjoyable drinking experience.

Sip-tube 01 in FIG. 1 and FIG. 3 is tapered 04. The tapered aspect is not necessary, but helps when adding the sip-tube to a lid sip-hole, so that the lid can be packaged and stacked on top itself, much like standard lids are stacked. The other purpose of this slight taper is so that a lid can be produced using standard lid manufacturing processes. Some processes can produce depressions such as the sip-tube without a slight angle on it, but most must use a tiny angle so that the lid can be easily removed from its mold during manufacture. The third purpose of the taper is to allow easy entry for a hole-punch to cutout the liquid entry hole 07 in side of a bottom closed tube, or curved bottom sip-tube, such as the one illustrated in FIG. 8.

Some embodiments of the tube extension work better with a vented 06 flow-path, such as those illustrated in FIG. 2, 4, 7, 8, and FIG. 12. The vented 06 hole serves several notable purposes but is not limited to these; first it allows more liquid to flow into the flow-path for faster pour and suction, second it allows for cross flow of liquid which also aids in this but also deflects liquid, third it allows equal liquid flow distribution, forth it serves as an air hole for better liquid flow and pour. The difference in sizing, number of vented holes and position of these vented holes can further increase some of the benefits mentioned, and can add some additional flow and deflection benefits. By adding vented holes, the base side opening of a sip-tube can be designed to be smaller then sip-hole it will be placed in, but still allow for the same, or more liquid to enter the flow-path. A good spot for placement of a vented hole is on the top side of sip-tube, situated between the wall of container, and the sip-tube, such as that in FIG. 2 and FIG. 8. The placement of this hole is helpful when attempting to pour out every last drop of liquid held in the container.

Some of the flow-paths, such as those illustrated in most of the FIG.'s, with the exception of FIG. 4 are single path sip-tubes.

The flow-path in FIG. 4 has an angle 03 formed along its path. Other extended flow-paths have more then one angle 03 formed along their flow-paths. These angles create a labyrinth of flow-paths each designed to further deflect sloshing liquids. By directing liquid through two or more angled flow-paths, in opposing directions, it forces the liquid into a desired and controlled flow direction and rate. These additional angles help to further deflect and control liquid flow and rate.

These angles serve other functions as well; first they help to lessen the accidental or undesirable sloshing and splashing of liquid flow in an upward direction, and in a forward/backward direction by blocking and redirecting multiple slosh directions into a controlled and desirable direction, they give the liquid more space to settle before it can exit the container, and they deflect the liquid back at itself before it ever enters the sip-tube. The triple angle, not illustrated within deflects sloshing liquid multiple times by the time it reaches the exit point on the topside of the sip-tube. For use in certain applications, a flow-path formed in two or more opposing directions works incredibly well because it forces the liquid to travel in the opposite direction it did from the previous angle, this kind of reverse angle sip-tube can sometimes deflect and control sloshing liquid better then a single flow-path.

The single formed angled flow-path performs the same functions mentioned above, but does so in a simpler way, and these single angle designs can be manufactured by a broader range of processes, some that could be cheaper to produce then a multiple angled flow-path.

The flow-path sip-tube deflection process further benefits when accompanied by a secondary base opening 07, as seen in FIG. 5, formed at the exterior bottom side opening of the hollow flow-path. The base opening angle on the flow-path aides by further deflecting sloshing liquid before it ever enters the sip-tube. It also helps to guide liquid into the flow-path as the beverage container empties or the cup tilts. The slightest difference in this base angle might add some advantages in liquid sloshing in one direction, however it might lessen other advantages gained by the flow-path of sloshing liquids in other directions. The preferred angle varies with size of the bottom opening hole and the number of angles along the flow-paths. The angle is not necessary, however it can be beneficial in some embodiments. It also aids and helps when trying to access all liquids within the container when pouring it and draining it. This exterior angle also aides in helping the sip-tube lay in an accommodating position to the internal angular shape of the container, thereby better improving suction and pouring abilities. An example of this is not illustrated within. The distance between the internal wall of the container and sip-tube also helps aide in the deflection of sloshing. The preferred distance varies with the viscosity of the liquid. A double base angle, or double opening flow-path, not illustrated within works well also.

Flows paths can be enhanced with the addition of viscosity barrier 05 as illustrated in FIG. 4. This double angle flow-path combined with viscosity barrier 05 slows down sloshing liquid and channels it by splitting it into a controlled and desired flow.

Viscosity barrier 05 in FIG. 4 adds a filter-like feature that breaks up sloshing liquid and makes it harder for liquid to unintentionally enter the flow-path. The more viscous the liquid, the more deflection force is applied on the sloshing liquid. This internal barrier works and performs the same function as an external one. In other embodiments not illustrated, a viscosity barrier is formed as both an exterior and interior barrier, running the full length of the flow-path, from the base opening to the top opening. Internal viscosity barriers create channels or cambers. These chambers constrict the passage of liquid and help to better control liquid flow and direction. Multiple barriers of different shapes and sizes can be formed outside or inside a sip-tube to increase these benefits. Many barriers can be combined to form a screen-like membrane that liquid can pass through. This screen-like membrane can further deflect sloshing liquids. These viscosity barriers push against the viscous forces of liquids, further deflecting sloshing liquids and making it harder for unintentional liquids to escape from the topside of the sip-tube. The more of these barriers added, the better they deflect liquids. The angle of the barrier, direction they run, thickness, number placement of the barrier within or on the flow-path, and space between the inner walls of the cambers and flow-path are all important when considering desired flow control and liquid direction. These barriers can also be used as a support structure when using weaker, softer or edible materials when constructing a sip-tube.

FIG. 8 illustrates a upward-curved base 23, this base works well in redirecting liquid. A double curved base works well at deflecting liquid and makes for easy draining of liquid entering the sip-tube. These curved bases perform a similar function as the angles in a flow-path do.

Figure 10:
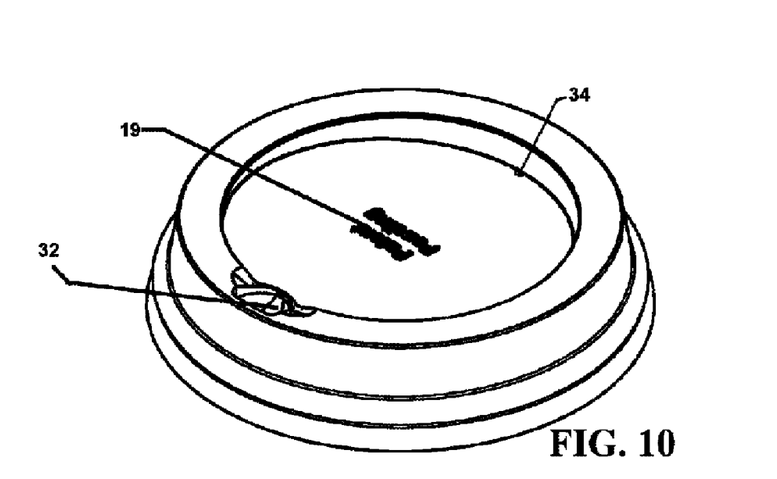
FIG. 10 is a top down tilted front to back side view of a wide-mouth embodiment.

FIG. 10 illustrates advertising and marketing 19 aspect. Branding can be placed along these larger extensions, much like branding is placed along beverage lids in the market. This is advantageous for licensing and commercial use.

Another benefit gained from the sip-tube extension is that it seals the top-side of the sip-hole and forms a small tubular chamber, blocking the largest hole where heat escapes from. Therefore it works to keep the liquid inside the container, hot or cold, at its desired temperature for a longer period of time. The sip-tube helps to shield and preserve the internal environment within the container from the external environment surrounding the container.

Figure 11:
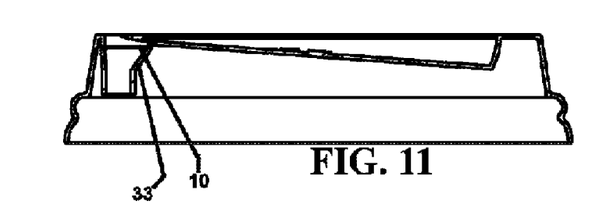
FIG. 11 is a cross section view of a similar wide-mouth embodiment seen in FIG. 10.

The inner flow-path of FIG. 11, has an interior flange or protrusion 10 that can be seen in this cross-section view. This serves as a splashguard to deflect upward sloshing liquids within the flow-path. As a splashguard deflector, one or more of these protrusions could be beneficial along the inner flow-path of a sip-tube. They can be placed in multiple areas, sized and shaped in various configurations to deflect upward sloshing liquid. This element might be hard to manufacture using certain processes. Other methods would lend better to forming this feature.

Figure 12:
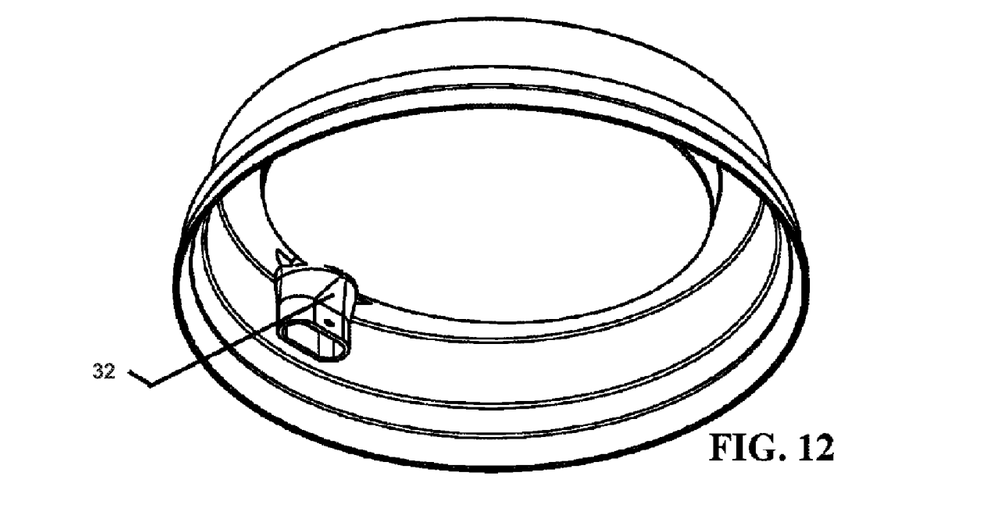
FIG. 12 is a bottom tilted side view of a wide-mouth embodiment similar to FIG. 10.

FIG. 10, 11 and FIG. 12 illustrate a wide-mouth rear-draining sip-tube beverage lid. Both the rear-draining aspect 35, and the wide-mouth 33 aspect, can be seen in cross section view FIG. 11. 34 air and drain hole is set at the lowest point of gravity, so any excess liquid that finds its way on to the topside of the lid, would drain back into the container. When the hole is punched in the lid, it could be punched downwards, leaving a slight downward depression, within the small drain hole depression. This would help block up splash and help with draining. Wide-mouth aspect 33 gives upwards splashing liquid more area to spread and settle before it gets a chance to bounce up and out of sip-hole. It also allows more liquid to pass through the sip-tube. It also helps in many ways like the tapered 04 element, such as; stacking lids, ease of hole punching, ease of molding and releasing, to name a few. The wide-mouth hole can be shaped to conform to the natural upside down heart shape of the open resting lips, rather than the standard oval found on most sip-hole. This improved shape in addition to the lip-resting zone makes for a natural fit and seal for the lips. The sip-tube can benefit by the addition of 32 groove lift element, this element works similar to viscosity barrier 05. It helps to channel and direct the liquid, breaking it from its current undesired flow, and placing it into a desired and directed flow. FIG. 10, illustrates 32 from a topside, while FIG. 12 illustrates it from a bottom backside view.

FIG. 13, 14, 15 & FIG. 16 illustrate another integrated improvement, 76 the plug. The plug can sized and shaped to fit any sip-hole. It can be made from the same material, process, and run with the lids. In certain embodiments, the plug would an additional aspect, that can be attached to a lid, without adding much cost, or without causing any problems with stacking lids. The male end can be inserted into a sip-hole such as in FIG. 14, and removed and stored in a opposing female 76b cavity as desired such as in FIG. 13. 76c is a lip or flange added to grab the small piece. Other plugs can be used, such as inserts, hard, soft, sticky, and bonded. Another air hole can be added to female cavity such as that in FIG. 15. Built in slide plugs, folds plugs, flip plugs can built formed on part in one manufacturing process.

69 pool backstop is elevated above the base of the pool, formed to stop liquid runoff directed from the sip-hole, groove, swoop and pool. This backstop prevents liquid from bouncing around on top a cover.

FIG. 13 illustrates a top down view of another preferred embodiment.

Concave sip-hole, tube extension, inlet, lip-groove, nose depression, liquid groove, swoop, angle, pool, drain, plug, all make for a well rounded beverage cover that looks, feels, fits, and preforms better then any other lid.

These improvements can be shaped and sized to be incorporated into any container sip-hole, or lid. It would work well with box beverages and could be used to replace the common straw with a cheaper and eco-friendly solution.

Other materials include paper, cardboard, plastics, polymers, compounds, mixtures and various combinations for these. Standard materials used in the container, cup, utensil and lid industries would work well. Different materials, or combinations of materials, might call for other known manufacturing processes, or others yet to be discovered. A preferred method would likely be the cheapest. Newer scented materials have become popular in the beverage industry as of late. The device would farewell being designed from a flavored, and or scented material. Visual temperature/thermal changing monitoring materials have become popular recently as well in the beverage industry. A device that changes color with temperature would be advantageous for safety and best flavor drinking temperature.

Although the description above contains much specificity, these should not be construed as limiting the scope of the embodiments but as merely providing illustrations of some of the presently preferred embodiments. Many other beneficial results can be attained by applying the disclosed invention in a different manner or by modifying the invention as was described to show several possibilities.

The scope of this application should not be solely determined by the examples given but also by the appended claims and their legal equivalents as well.

What is claimed is:

1. An improved beverage lid comprising;
   a rim and lip for securing the improved beverage lid to a container, the improved beverage lid defining a top surface;
   a raised portion positioned along the top surface and extending above the rim;
   at least one partially concave sip-hole, wherein the top surface includes a first concave surface portion that extends inwardly from the at least one partially concave sip-hole away from an outer edge of the lid and towards a center of the lid, and a second concave surface portion extending partially around the at least one partially concave sip-hole, wherein the first concave surface portion is angled to direct a liquid into the at least one partially concave sip hole;
   at least one extended flow-path tube extending downwardly from the at least one partially concave sip-hole;
   at least one inlet opening on a side wall of the at least one extended flow-path tube;
   at least one liquid-pool; and
   at least one air liquid-drain hole, whereby said components work together to limit and control gas liquid molecule bi-directional communication between a container, a lid, and their surroundings.

2. The improved beverage lid of claim 1, wherein the at least one inlet opening is positioned along the top surface below and inward of the raised portion.

3. The improved beverage lid of claim 1, further comprising a channeled groove that extends inwardly from the at least one partially concave sip-hole toward the at least one liquid-pool.

4. The improved beverage lid of claim 1, wherein the at least one air liquid-drain hole is positioned along a surface defined by the at least one liquid-pool.

5. The improved beverage lid of claim 1, wherein the at least one partially concave sip-hole is positioned along a concave surface portion of the raised portion.

6. The improved beverage lid of claim 1, further comprising:
   a plug sized to removably seal the at least one partially concave sip-hole; and
   a cavity formed along the top surface inward of the raised portion for receiving the plug.

7. The improved beverage lid of claim 1, further comprising: a lip-groove that defines a depression outward of the at least one partially concave sip-hole and formed along the raised portion.

8. The improved beverage lid of claim 1, further comprising: a nose-depression extending inward toward the at least one air liquid-drain hole.

9. The improved beverage lid of claim 8, further comprising: at least one channeled groove extending along a midline of the nose depression toward the at least one air liquid-drain hole.

10. The improved beverage lid of claim 1, further comprising: at least one liquid backstop positioned along a distal portion of the at least one liquid pool.

11. An improved container cover comprising:
- at least one sip hole positioned on a top surface of the container cover;
- a first portion of a concave surface formed at least partially along an inside perimeter of the at least one sip hole and a second portion of the concave surface extending inwardly from the inside perimeter and towards a center of the container, wherein the second portion of the concave surface is angled to direct a liquid into the at least one sip hole;
- an integrated tube extending downward from the at least one sip hole; and
- at least one inlet opening along a side wall of the integrated tube, wherein the at least one sip hole, the concave surface, the integrated tube, and the at least one inlet cooperatively function to form a bi-directional liquid-pull-drain to control, limit, pool, and guide any escaped liquid found on the top surface of the improved container cover back into a container.

12. The improved container cover of claim 11, wherein the improved container cover is an integrated component of the container.

13. The improved container cover of claim 11, wherein the improved container cover further comprises at least one rear draining surface centrally located along the top surface of the improved container cover that guides pooled liquid away from the sip-hole and back into the container.

14. The improved container cover of claim 11, wherein a portion of the top surface of the improved container cover directly behind the concave surface further comprises a downward grooved or swooped surface angled down and away from the concave surface, to form a central pool of escaped liquid that is configured with at least one central air-liquid-drain hole, wherein
- the central pool of escaped liquid flows away from the concave surface and back into the container, and wherein
- the downward grooved or swooped surface is sized and shaped to accommodate a user's nose, such that the improved container cover may be tilted higher without hitting the user's nose, and thereby allowing escaped liquid pooled along the downward grooved or swooped surface to align up with a user's nostrils, thereby allowing a user to smell the escaped liquid.

15. The improved container cover of claim 11, wherein the integrated tube comprises a tapered portion, wherein liquid communication can further be controlled by providing more surface area for the escaped liquid to disperse and settle, and for allowing the improved container covers to be tightly stacked.

16. The improved container cover of claim 11, further comprising a plug, the plug including a friction fit means for removably securing the plug to the improved container cover.

17. The improved container cover of claim 11, being made from an eco-friendly material.

* * * * *